(12) United States Patent
Kulkarni

(10) Patent No.: US 9,576,139 B2
(45) Date of Patent: Feb. 21, 2017

(54) TECHNIQUES FOR A SECURE GRAPHICS ARCHITECTURE

(75) Inventor: Sunil A. Kulkarni, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 318 days.

(21) Appl. No.: 13/977,052

(22) PCT Filed: Mar. 16, 2012

(86) PCT No.: PCT/US2012/029314
§ 371 (c)(1),
(2), (4) Date: Jun. 28, 2013

(87) PCT Pub. No.: WO2013/137894
PCT Pub. Date: Sep. 19, 2013

(65) Prior Publication Data
US 2014/0043344 A1    Feb. 13, 2014

(51) Int. Cl.
*G06F 15/16* (2006.01)
*G06F 21/60* (2013.01)
*G06T 15/00* (2011.01)
*G06T 1/20* (2006.01)
*G06F 13/38* (2006.01)

(52) U.S. Cl.
CPC ........... *G06F 21/606* (2013.01); *G06F 13/385* (2013.01); *G06T 1/20* (2013.01); *G06T 15/005* (2013.01)

(58) Field of Classification Search
CPC ............. G06T 1/20; G06T 15/005; G06T 1/60
See application file for complete search history.

(56) References Cited

U.S. PATENT DOCUMENTS

| | | | | |
|---|---|---|---|---|
| 4,967,392 | A * | 10/1990 | Werner et al. | 345/505 |
| 5,010,515 | A * | 4/1991 | Torborg, Jr. | 345/505 |
| 6,545,683 | B1 * | 4/2003 | Williams | 345/522 |
| 7,577,917 | B2 * | 8/2009 | Vong | 715/767 |
| 7,661,107 | B1 * | 2/2010 | Van Dyke et al. | 718/104 |
| 7,773,090 | B1 | 8/2010 | Diard et al. | |
| 8,365,153 | B2 * | 1/2013 | Chen et al. | 717/140 |
| 2003/0080963 | A1 * | 5/2003 | Van Hook | A63F 13/00 345/501 |
| 2008/0030510 | A1 | 2/2008 | Wan et al. | |
| 2008/0303835 | A1 | 12/2008 | Swift et al. | |
| 2009/0002380 | A1 * | 1/2009 | Langyel et al. | 345/522 |

(Continued)

OTHER PUBLICATIONS

International Search Report and Written Opinion mailed Nov. 28, 2012 for corresponding PCT/US2012/029314 filed Mar. 16, 2012 (ten (10) pages).

Primary Examiner — Charles Tseng

(57) ABSTRACT

Techniques for implementing a secure graphics architecture are described. In one embodiment, for example, an apparatus may comprise a processor circuit and a graphics management module, and the graphics management module may be operative to receive graphics information from the processor circuit, generate graphics processing information based on the graphics information, and send the graphics processing information to a graphics processor circuit arranged to generate graphics display information based on the graphics processing information. In this manner, security threats such as screen capture attacks and/or theft of content protected media streams may be reduced. Other embodiments may be described and claimed.

15 Claims, 8 Drawing Sheets

(56) References Cited

U.S. PATENT DOCUMENTS

| | | | |
|---|---|---|---|
| 2009/0141033 A1* | 6/2009 | Street | 345/506 |
| 2010/0214301 A1* | 8/2010 | Li et al. | 345/522 |
| 2011/0252153 A1 | 10/2011 | Vlodavsky | |
| 2012/0293519 A1* | 11/2012 | Ribble | G06T 15/005 345/501 |
| 2013/0147813 A1* | 6/2013 | Rogers | G06T 1/20 345/502 |

* cited by examiner

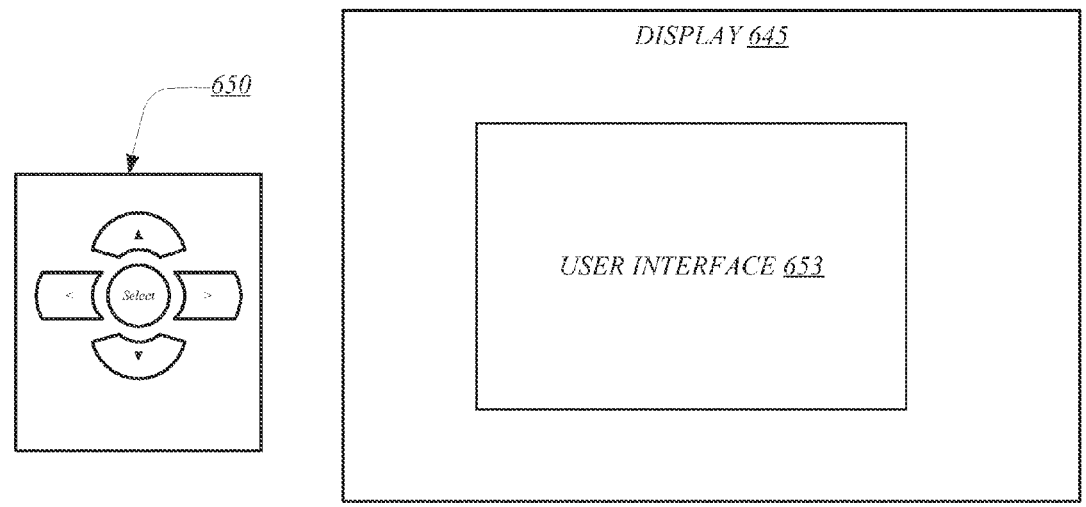
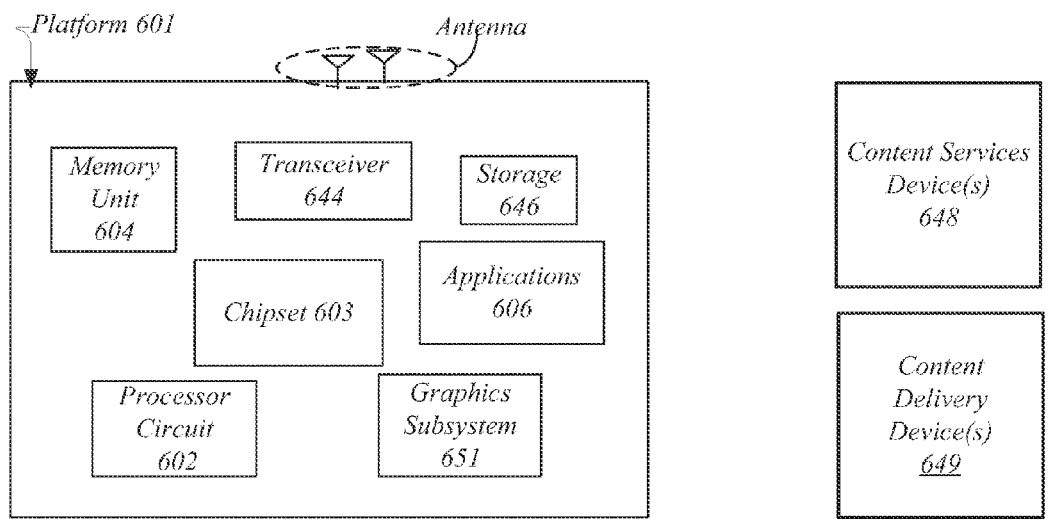
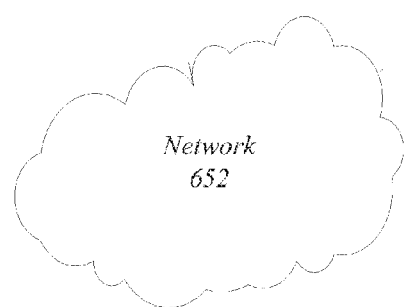
FIG. 6

TECHNIQUES FOR A SECURE GRAPHICS ARCHITECTURE

BACKGROUND

In a traditional computing system, graphics may be implemented using drivers run by a main processing circuit that also implements the application and operating system runtimes of the computing system. This may expose graphics operations to security threats, because malware may gain access to graphics memory space via the user mode and/or kernel mode graphics drivers run by the main processing circuit. For example, a system in which the graphics drivers are run by the main processing circuit may be subject to screen capture attacks and/or theft of content protected media streams. Accordingly, techniques for isolating graphics processing from the main processing circuit by implementing a secure graphics architecture are desirable.

BRIEF DESCRIPTION OF THE DRAWINGS

FIG. 6 illustrates one embodiment of a third system.

DETAILED DESCRIPTION

Various embodiments may be generally directed to techniques for implementing a secure graphics architecture. In one embodiment, for example, an apparatus may comprise a processor circuit and a graphics management module, and the graphics management module may be operative to receive graphics information from the processor circuit, generate graphics processing information based on the graphics information, and send the graphics processing information to a graphics processor circuit arranged to generate graphics display information based on the graphics processing information. In this manner, security threats such as screen capture attacks and/or theft of content protected media streams may be reduced. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1A:
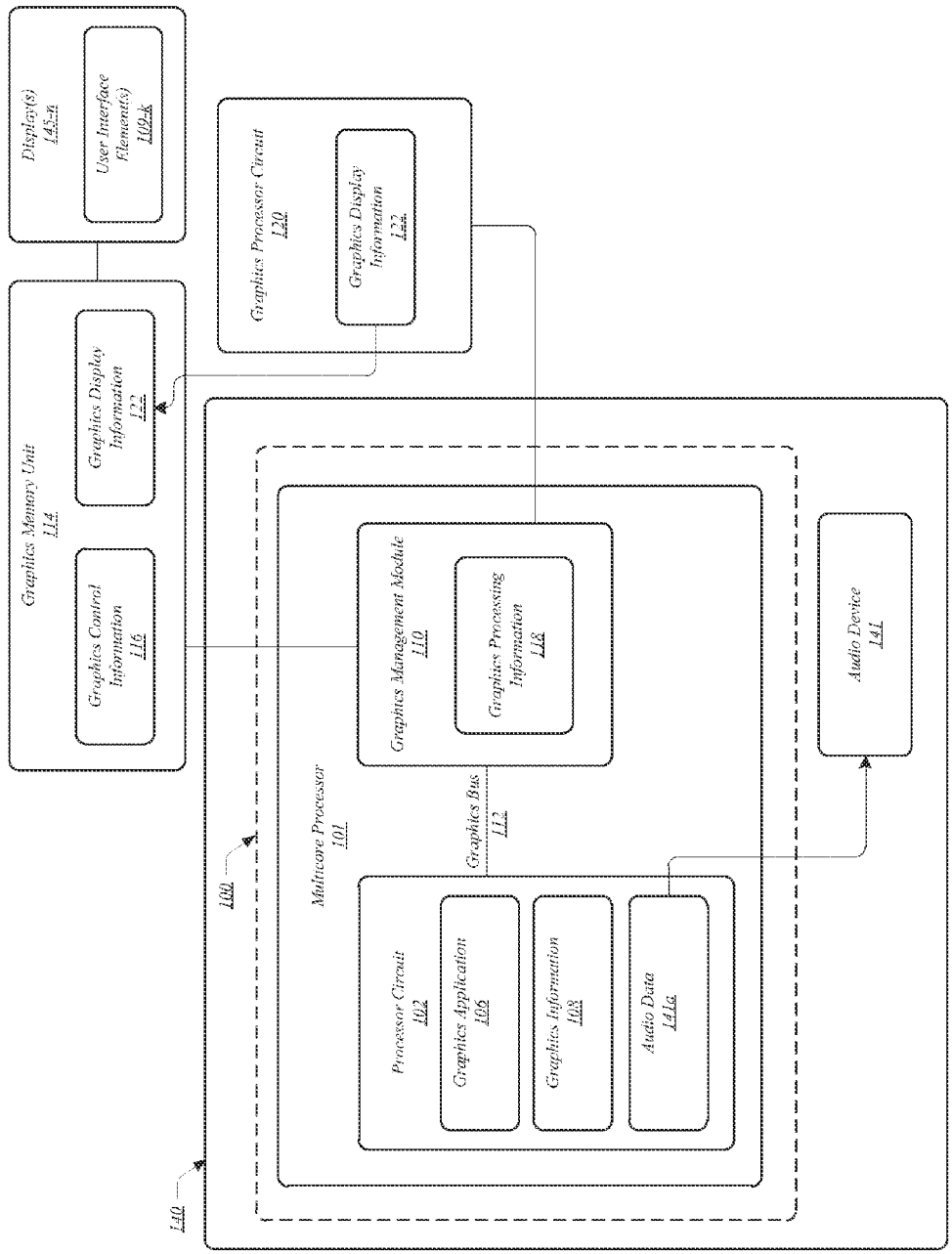
FIG. 1A illustrates one embodiment of a first apparatus and one embodiment of a first system.

FIG. 1A illustrates a block diagram of an apparatus 100. As shown in FIG. 1A, apparatus 100 comprises multiple elements including a processor circuit 102, a graphics bus 110, and a graphics management module 112. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise graphics management module 110. Graphics management module 110 may comprise logic or circuitry operative to process information, logic, or data received from processor circuit 102 and/or one or more elements external to apparatus 100 and to generate processing information based on the received information, logic, or data. In various embodiments, graphics management module 110 may comprise one or more cores of a multicore processor 101, and processor circuit 102 may comprise one or more other cores of the multicore processor 101. The embodiments are not limited in this context.

In some embodiments, graphics management module 110 may be communicatively coupled to processor circuit 102 via a graphics bus 112. Graphics bus 112 may comprise any wired or wireless communications medium capable of relaying information, logic, or data between processor circuit 102 and graphics management module 110. In some embodiments, graphics bus 112 may comprise a private bus. The embodiments are not limited in this context.

FIG. 1A may also illustrate a block diagram of a system 140 in various embodiments. System 140 may comprise any of the aforementioned elements of apparatus 100. System 140 may further comprise an audio device 141 in some embodiments. Audio device 141 may comprise any device capable of generating tones, music, speech, speech utterances, sound effects, background noise, or other sounds based on received audio data. Examples of audio device 141 may include a speaker, a multi-speaker system, a home entertainment system, a television, a consumer appliance, a computer system, a mobile device, and a portable electronic media device, among other examples. The embodiments are not limited in this context.

In some embodiments, audio device 141 may be arranged to generate tones, music, speech, speech utterances, sound effects, background noise, or other sounds based on audio data 141a received from apparatus 100. In some embodiments, audio data 141a may be generated by processor circuit 102 in execution of graphics application 106. The embodiments are not limited in this context.

In various embodiments, apparatus 100 and/or system 140 may be communicatively coupled to a graphics memory unit 114. Graphics memory unit 114 may be implemented using any machine-readable or computer-readable media capable of storing data, including both volatile and non-volatile memory. For example, graphics memory unit 114 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of graphics memory unit 114 may be included on the same integrated circuit as processor circuit 102 and/or graphics management module 110, or alternatively some portion or all of graphics memory unit 114 may be disposed on an integrated circuit or other medium, for example a hard disk drive, that is external to the integrated circuit(s) of processor circuit 102 and/or graphics management module 110. The embodiments are not limited in this context.

In some embodiments, apparatus 100 and/or system 140 may be communicatively coupled to a graphics processor circuit 120. Graphics processor circuit 120 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Graphics processor circuit 120 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, graphics processor circuit 120 may be implemented as a dedicated graphics processor, such as a graphics processor made by Intel® Corporation, Santa Clara, Calif. The embodiments are not limited in this context.

In various embodiments, apparatus 100 and/or system 140 may be arranged to communicatively couple with one or more displays 145-$n$. It is worthy of note that "n" and similar designators as used herein are intended to be variables representing any positive integer. Thus, for example, if an implementation sets a value for n=3, then a complete set of displays 145-$n$ may include displays 145-1, 145-2, and 145-3. Display(s) 145-$n$ may comprise any device(s) capable of displaying one or more user interface elements. User interface elements may comprise any visual or optical sensory effect(s) such as, for example, images, pictures, video, text, graphics, menus, textures, and/or patterns. Examples for display(s) 145-$n$ may include a television, a monitor, a projector, and a computer screen. In one embodiment, for example, display(s) 145-$n$ may be implemented by liquid crystal display (LCD) displays, light emitting diode (LED) displays, or other types of suitable visual interfaces. Display(s) 145-$n$ may comprise, for example, touch-sensitive color display screens. In various implementations, display(s) 145-$n$ may comprise one or more thin-film transistors (TFT) LCD including embedded transistors. The embodiments are not limited in this context.

In some embodiments, processor circuit 102 may be operable to execute a graphics application 106. Graphics application 106 may comprise any application featuring graphics capabilities, such as, for example, an image or video viewing application, an image or video playback application, a streaming video playback application, a multimedia application program, a system program, a conferencing application, a gaming application, a productivity application, a messaging application, an instant messaging (IM) application, an electronic mail (email) application, a short messaging service (SMS) application, a multimedia messaging service (MMS) application, a social networking application, a web browsing application, and so forth. The embodiments are not limited in this context.

In various embodiments, graphics application 106 may be operative to generate graphics information 108. Graphics information 108 may comprise data, information, or logic corresponding to one or more user interface elements 109-$k$. The data, information, or logic comprised within graphics information 108 may be usable by apparatus 100, system 140, and/or one or more elements external to apparatus 100 and/or system 140 to cause user interface elements 109-$k$ to be displayed by one or more displays 145-$n$. In some embodiments, graphics information 108 may comprise application-level graphics instructions and/or data. The embodiments are not limited in this context.

In general operation, graphics management module 110 may be operative to receive graphics information 108 from processor circuit 102, generate graphics processing information 118 based on graphics information 108, and send graphics processing information 118 to graphics processor circuit 120. Graphics processing information 118 may comprise data, information, or logic corresponding to the same user interface elements 109-$k$ as graphics information 108, but at a further stage of the graphics pipeline than that of graphics information 108. For example, in various embodiments, graphics information 108 may comprise application-level graphics instruction and/or data, and graphics processing information 118 may comprise graphics vertices. In various embodiments, graphics management module 110 may receive graphics information 108 from processor circuit 102 over graphics bus 112. The embodiments are not limited in this context.

In some embodiments, graphics management module 110 may generate graphics processing information 118 based on graphics information 108 and graphics control information 116. Graphics control information 116 may comprise logic, information, or data describing functionality and/or formatting constraints of graphics processor circuit 120 and/or one or more displays 145-$n$. For example, in various embodiments, graphics control information 116 may comprise user mode and/or kernel mode graphics drivers. In some embodiments, prior to generating graphics processing information 118, graphics management module 110 may retrieve graphics control information 116 from graphics memory unit 114. Graphics management module 110 may then generate graphics processing information 118 based on both graphics information 108 and graphics control information 116, to ensure that graphics processing information 118 is usable by graphics processor circuit 120 and one or more displays 145-$n$ to display the user interface elements 109-$k$ to which graphics information 108 and graphics processing information 118 correspond. The embodiments are not limited in this context.

In various embodiments, graphics processor circuit 120 may be operative to generate graphics display information 122 based on graphics processing information 118, and store graphics display information 122 in graphics memory unit 114. Graphics display information 122 may comprise data, information, or logic corresponding to the same user interface elements 109-$k$ as graphics information 108 and graphics processing information 118, but at a further stage of the graphics pipeline than graphics information 108 and graphics processing information 118. For example, in various embodiments, graphics information 108 may comprise application-level graphics instruction and/or data, graphics processing information 118 may comprise graphics vertices, and graphics display information 122 may comprise pixel color values. The embodiments are not limited in this context.

In some embodiments, displays 145-$n$ may be operative to receive graphics display information 122 and use graphics display information 122 to display user interface elements 109-$k$. For example, in some embodiments, graphics display information may comprise pixel color values, displays 145-$n$ may display pixels according to those pixel color values, and the displayed pixels may form one or more images, pictures, video, text, graphics, menus, textures, and/or patterns that constitute user interface elements 109-$k$. The embodiments are not limited in this context.

Isolating graphics management module 110 and access to graphics control information 116 from processor circuit 102 may reduce security threats with respect to graphics operations of apparatus 100 and/or system 140. Malware running on processor circuit 102 may be unable to access graphics memory space, because it does not have direct access to graphics control information 116. Furthermore, graphics operations may be protected from security threats originating from other components of apparatus 100 and/or system 140, because graphics management module 110 may communicate using a separate bus from that used by other components of apparatus 100 and/or system 140.

In various embodiments, graphics management module 110 may generate graphics processing information 118 using a different instruction set than that used to generate graphics information 108. For example, graphics management module 110 may generate graphics processing information 118 using a proprietary instruction set that is not publicly available, while graphics information 108 may be generated using a publicly available general purpose instruction set. In some embodiments, the instructions based on which graphics processing information 118 is generated may be compiled using a different compiler than that by which the instructions based on which graphics information 108 are generated are compiled. In various embodiments, graphics information 108, graphics processing information 118, and/or graphics display information 122 may be encrypted using any known encryption technique. The embodiments are not limited in this context.

Figure 1B:
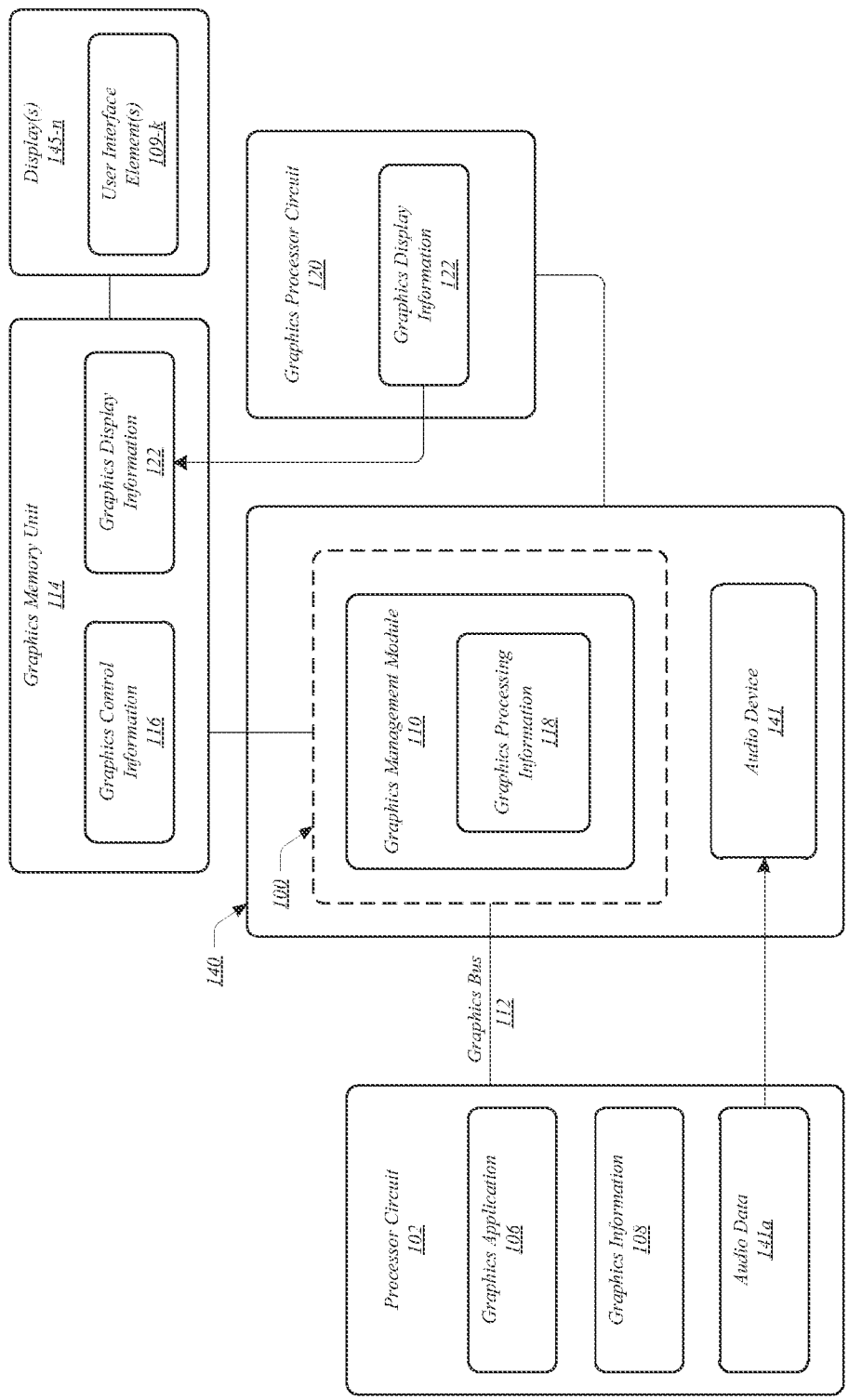
FIG. 1B illustrates another embodiment of the first apparatus and another embodiment of the first system.

FIG. 1B may illustrate an alternate embodiment of apparatus 100 and an alternate embodiment of system 140. As shown in FIG. 1B, rather than being comprised within a multicore processor along with processor circuit 102, graphics management module 110 may alternatively comprise a component external to processor circuit 102. For example, graphics management module 110 may comprise a separate processor or separate logic circuitry. Embodiments of apparatus 100 and/or system 140 in which graphics management module 110 comprises a component external to processor circuit 102 may otherwise generally perform the same operations as embodiments of apparatus 100 and/or system 140 in which processor circuit 102 and graphics management module 110 are comprised within a single multicore processor. Likewise, embodiments of apparatus 100 and/or system 140 in which graphics management module 110 comprises a component external to processor circuit 102 may generally offer the same advantages as embodiments of apparatus 100 and/or system 140 in which processor circuit 102 and graphics management module 110 are comprised within a single multicore processor. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 2:
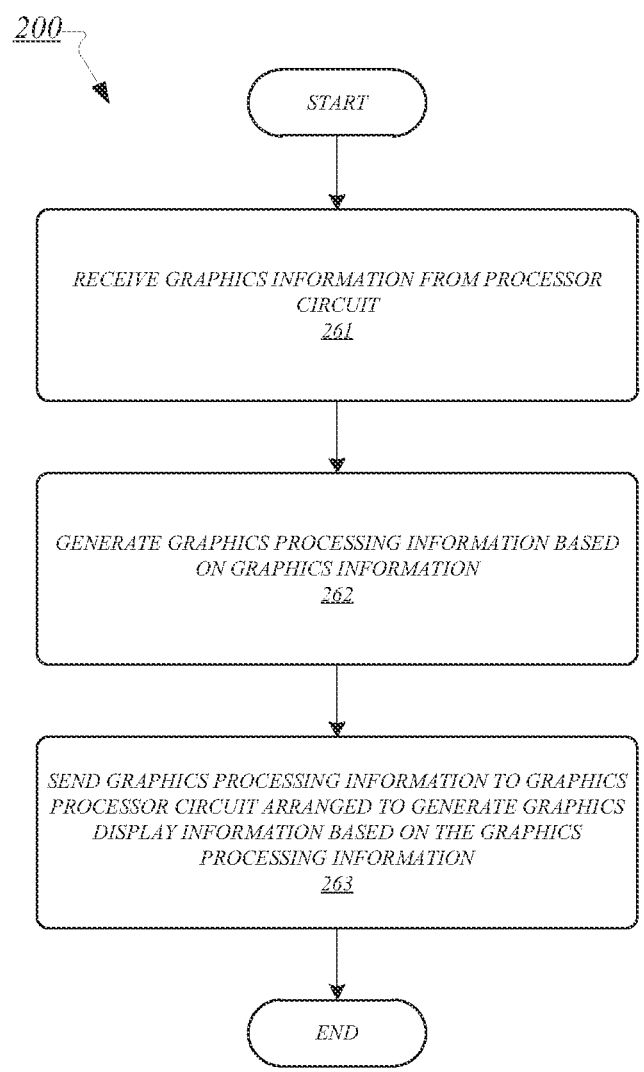
FIG. 2 illustrates one embodiment of a first logic flow.

FIG. 2 illustrates one embodiment of a logic flow 200, which may be representative of the operations executed by one or more embodiments described herein. As shown in logic flow 200, graphics information may be received from a processor circuit at block 261. For example, graphics management module 110 of FIG. 1A may receive graphic information 108 from processor circuit 102. At block 262, graphics processing information may be generated based on the received graphics information. For example, graphics management module 110 of FIG. 1A may generate graphics processing information 118 based on graphics information 108. At block 263, the graphics processing information may be sent to a graphics processor circuit that is arranged to generate graphics display information based on the graphics processing information. For example, graphics management module 110 of FIG. 1A may send graphics processing information 118 to graphics processor circuit 120. The embodiments are not limited to these examples.

Figure 3:
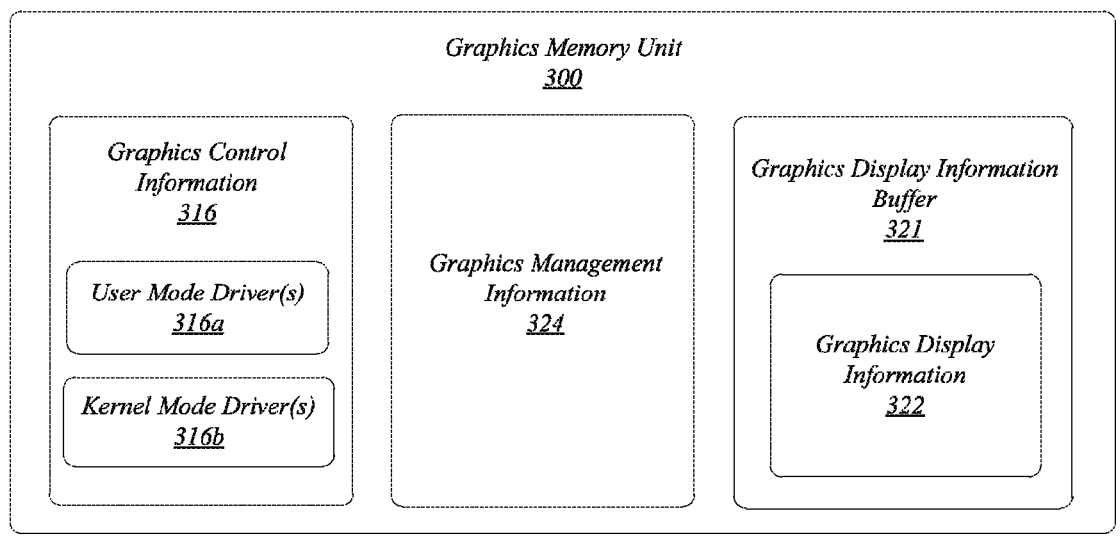
FIG. 3 illustrates one embodiment of a graphics memory unit.

FIG. 3 illustrates one embodiment of a graphics memory unit 300. Graphics memory unit 300 may comprise graphics control information 316, graphics management information 324, and graphics display information buffer 321. In some embodiments, graphics memory unit 300 may store received graphics display information 322 in graphics display information buffer 321. In various embodiments, graphics display information buffer 321 may comprise one or more frame buffers. In some embodiments, graphics control information 316 may comprise one or more user mode drivers 316$a$ and one or more kernel mode drivers 316$b$. User mode drivers 316$a$ may comprise graphics and/or display drivers that do not have access to protected memory addresses. Kernel mode drivers 316$b$ may comprise graphics and/or display drivers that have access to protected memory addresses. In various embodiments, graphics management information 324 may comprise logic, data, or information used by one or more user mode drivers 316$a$ and/or one or more kernel mode drivers 316$b$. For example, graphics management information 324 may comprise communications buffers for one or more user mode drivers 316$a$ and/or one or more kernel mode drivers 316$b$, command buffers for one or more user mode drivers 316a and/or one or more kernel mode drivers 316b, information comprising the type and size of one or more windows to be displayed on one or more displays 145-n, and/or information indicating a current graphics state set by graphics application 106. The embodiments are not limited in this context.

Figure 4:
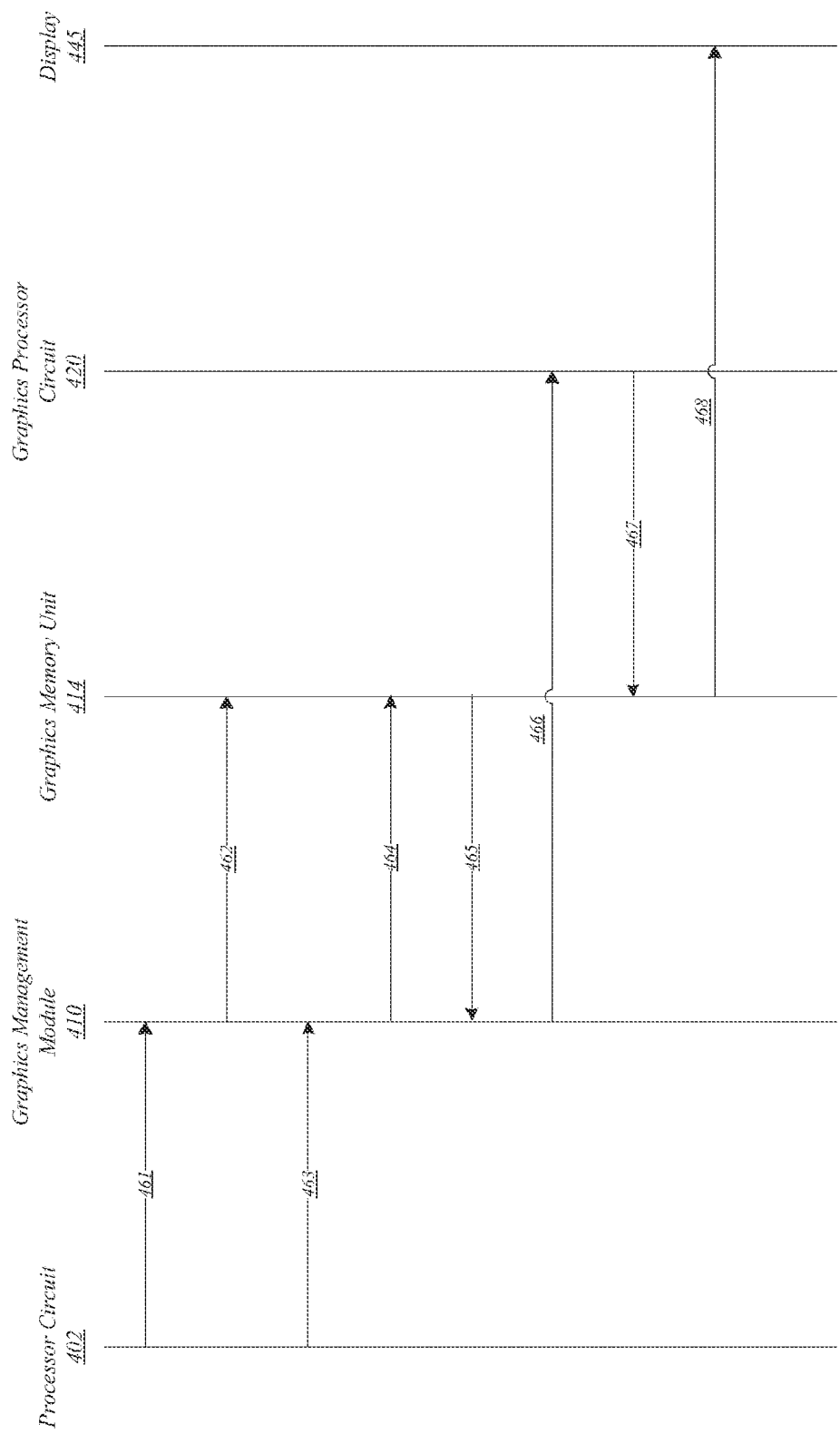
FIG. 4 illustrates one embodiment of a transmission diagram.

FIG. 4 illustrates one embodiment of a transmission diagram 400, which may be representative of one or more transmissions that may be performed in conjunction with one or more embodiments described herein. At 461, a processor circuit 402 may transmit graphics control information to a graphics management module 410. For example, processor circuit 102 of FIG. 1A may transmit graphics control information 116 to graphics management module 110. At 462, the graphics management module 410 may store the graphics control information in a graphics memory unit 414. For example, graphics management module 110 of FIG. 1A may store graphics control information 116 in graphics memory 114. At 463, the processor circuit 402 may transmit graphics information to the graphics management module 410. For example, processor circuit 102 of FIG. 1A may transmit graphics information 108 to graphics management module 110. At 464, the graphics management module 410 may transmit a request for the stored graphics control information to graphics memory unit 414. For example, graphics management module 110 of FIG. 1A may transmit a request for the stored graphics control information 116 to graphics memory unit 114.

At 465, graphics memory unit 414 may transmit the graphics control information to graphics management module 410. For example, graphics memory unit 114 of FIG. 1A may transmit graphics control information 116 to graphics management module 110. At 466, graphics management module 410 may transmit graphics processing information to a graphics processor circuit 420. For example, graphics management module 110 of FIG. 1A may transmit graphics processing information 118 to graphics processor circuit 120. At 467, graphics processor circuit 420 may store graphics display information in graphics memory unit 414. For example, graphics processor circuit 120 of FIG. 1A may store graphics display information 122 in graphics memory unit 114. At 468, the graphics display information may be transmitted to a display 445. For example, the graphics display information 122 of FIG. 1A may be transmitted to a display 145-1. The embodiments are not limited to these examples.

Figure 5:
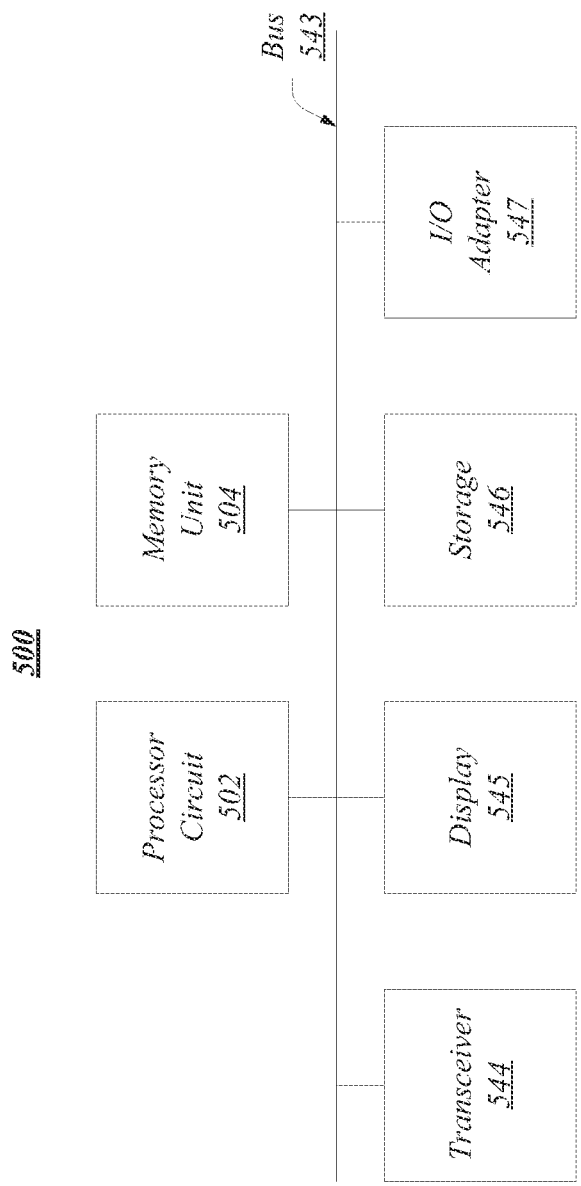
FIG. 5 illustrates one embodiment of a second system.

FIG. 5 illustrates one embodiment of a system 500. In various embodiments, system 500 may be representative of a system or architecture suitable for use with one or more embodiments described herein, such as apparatus 100 and/or system 140 of FIGS. 1A and/or 1B, logic flow 200 of FIG. 2, graphics memory unit 300 of FIG. 3, or transmission diagram 400 of FIG. 4. The embodiments are not limited in this respect.

As shown in FIG. 5, system 500 may comprise multiple elements. One or more elements may be implemented using one or more circuits, components, registers, processors, software subroutines, modules, or any combination thereof, as desired for a given set of design or performance constraints. Although FIG. 5 shows a limited number of elements in a certain topology by way of example, it can be appreciated that more or less elements in any suitable topology may be used in system 500 as desired for a given implementation. The embodiments are not limited in this context.

In various embodiments, system 500 may include a processor circuit 502. Processor circuit 502 may be implemented using any processor or logic device, and may be the same as or similar to processor circuit 102 of FIG. 1A.

In one embodiment, system 500 may include a memory unit 504 to couple to processor circuit 502. Memory unit 504 may be coupled to processor circuit 502 via communications bus 543, or by a dedicated communications bus between processor circuit 502 and memory unit 504, as desired for a given implementation. Memory unit 504 may be implemented using any machine-readable or computer-readable media capable of storing data, including both volatile and non-volatile memory. For example, memory unit 504 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory unit 504 may be included on the same integrated circuit as processor circuit 502, or alternatively some portion or all of memory unit 504 may be disposed on an integrated circuit or other medium, for example a hard disk drive, that is external to the integrated circuit of processor circuit 502. In some embodiments, the machine-readable or computer-readable medium may comprise a non-transitory medium. The embodiments are not limited in this context.

In various embodiments, system 500 may include a transceiver 544. Transceiver 544 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 544 may operate in accordance with one or more applicable standards in any version. The embodiments are not limited in this context.

In various embodiments, system 500 may include a display 545. Display 545 may comprise any television type monitor or display. Display 545 may comprise any display device capable of displaying information received from processor circuit 502, and may be the same as or similar to displays 145-n of FIG. 1A. The embodiments are not limited in this context.

In various embodiments, system 500 may include storage 546. Storage 546 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 546 may comprise technology to increase the storage performance enhanced protection for valuable digital media when multiple hard drives are included, for example. Further examples of storage 546 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 500 may include one or more I/O adapters 547. Examples of I/O adapters 547 may include Universal Serial Bus (USB) ports/adapters, IEEE 1394 Firewire ports/adapters, and so forth. The embodiments are not limited in this context.

FIG. 6 illustrates an embodiment of a system 600. In various embodiments, system 600 may be representative of a system or architecture suitable for use with one or more embodiments described herein, such as apparatus 100 and/or system 140 of FIGS. 1A and/or 1B, logic flow 200 of FIG. 2, graphics memory unit 300 of FIG. 3, transmission diagram 400 of FIG. 4, or system 500 of FIG. 5. The embodiments are not limited in this respect.

As shown in FIG. 6, system 600 may comprise multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 comprises a platform 601 coupled to a display 645. Platform 601 may receive content from a content device such as content services device(s) 648 or content delivery device(s) 649 or other similar content sources. A navigation controller 650 comprising one or more navigation features may be used to interact with, for example, platform 601 and/or display 645. Each of these components is described in more detail below.

In embodiments, platform 601 may comprise any combination of a processor circuit 602, chipset 603, memory unit 604, transceiver 644, storage 646, applications 651, and/or graphics subsystem 652. Chipset 603 may provide intercommunication among processor circuit 602, memory unit 604, transceiver 644, storage 646, applications 651, and/or graphics subsystem 652. For example, chipset 603 may include a storage adapter (not depicted) capable of providing intercommunication with storage 646.

Processor circuit 602 may be implemented using any processor or logic device, and may be the same as or similar to processor circuit 502 in FIG. 5.

Memory unit 604 may be implemented using any machine-readable or computer-readable media capable of storing data, and may be the same as or similar to memory unit 504 in FIG. 5.

Transceiver 644 may include one or more radios capable of transmitting and receiving signals using various suitable wireless communications techniques, and may be the same as or similar to transceiver 544 in FIG. 5.

Display 645 may comprise any television type monitor or display, and may be the same as or similar to display 545 in FIG. 5.

Storage 646 may be implemented as a non-volatile storage device, and may be the same as or similar to storage 546 in FIG. 5.

Graphics subsystem 652 may perform processing of images such as still or video for display. Graphics subsystem 652 may be a graphics processing unit (GPU) or a visual processing unit (VPU), for example. An analog or digital interface may be used to communicatively couple graphics subsystem 652 and display 645. For example, the interface may be any of a High-Definition Multimedia Interface, DisplayPort, wireless HDMI, and/or wireless HD compliant techniques. Graphics subsystem 652 could be integrated into processor circuit 602 or chipset 603. Graphics subsystem 652 could be a stand-alone card communicatively coupled to chipset 603.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 648 may be hosted by any national, international and/or independent service and thus accessible to platform 601 via the Internet, for example. Content services device(s) 648 may be coupled to platform 601 and/or to display 645. Platform 601 and/or content services device(s) 648 may be coupled to a network 653 to communicate (e.g., send and/or receive) media information to and from network 653. Content delivery device(s) 649 also may be coupled to platform 601 and/or to display 645.

In embodiments, content services device(s) 648 may comprise a cable television box, personal computer, network, telephone, Internet enabled devices or appliance capable of delivering digital information and/or content, and any other similar device capable of unidirectionally or bidirectionally communicating content between content providers and platform 601 and/display 645, via network 653 or directly. It will be appreciated that the content may be communicated unidirectionally and/or bidirectionally to and from any one of the components in system 600 and a content provider via network 653. Examples of content may include any media information including, for example, video, music, medical and gaming information, and so forth.

Content services device(s) 648 receives content such as cable television programming including media information, digital information, and/or other content. Examples of content providers may include any cable or satellite television or radio or Internet content providers. The provided examples are not meant to limit embodiments of the invention.

In embodiments, platform 601 may receive control signals from navigation controller 650 having one or more navigation features. The navigation features of navigation controller 650 may be used to interact with a user interface 654, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 650 may be echoed on a display (e.g., display 645) by movements of a pointer, cursor, focus ring, or other visual indicators displayed on the display. For example, under the control of software applications 651, the navigation features located on navigation controller 650 may be mapped to virtual navigation features displayed on user interface 654. In embodiments, navigation controller 650 may not be a separate component but integrated into platform 601 and/or display 645. Embodiments, however, are not limited to the elements or in the context shown or described herein.

In embodiments, drivers (not shown) may comprise technology to enable users to instantly turn on and off platform 601 like a television with the touch of a button after initial boot-up, when enabled, for example. Program logic may allow platform 601 to stream content to media adaptors or other content services device(s) 648 or content delivery device(s) 649 when the platform is turned "off." In addition, chip set 603 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 600 may be integrated. For example, platform 601 and content services device(s) 648 may be integrated, or platform 601 and content delivery device(s) 649 may be integrated, or platform 601, content services device(s) 648, and content delivery device(s) 649 may be integrated, for example. In various embodiments, platform 601 and display 645 may be an integrated unit. Display 645 and content service device(s) 648 may be integrated, or display 645 and content delivery device(s) 649 may be integrated, for example. These examples are not meant to limit the invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 601 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
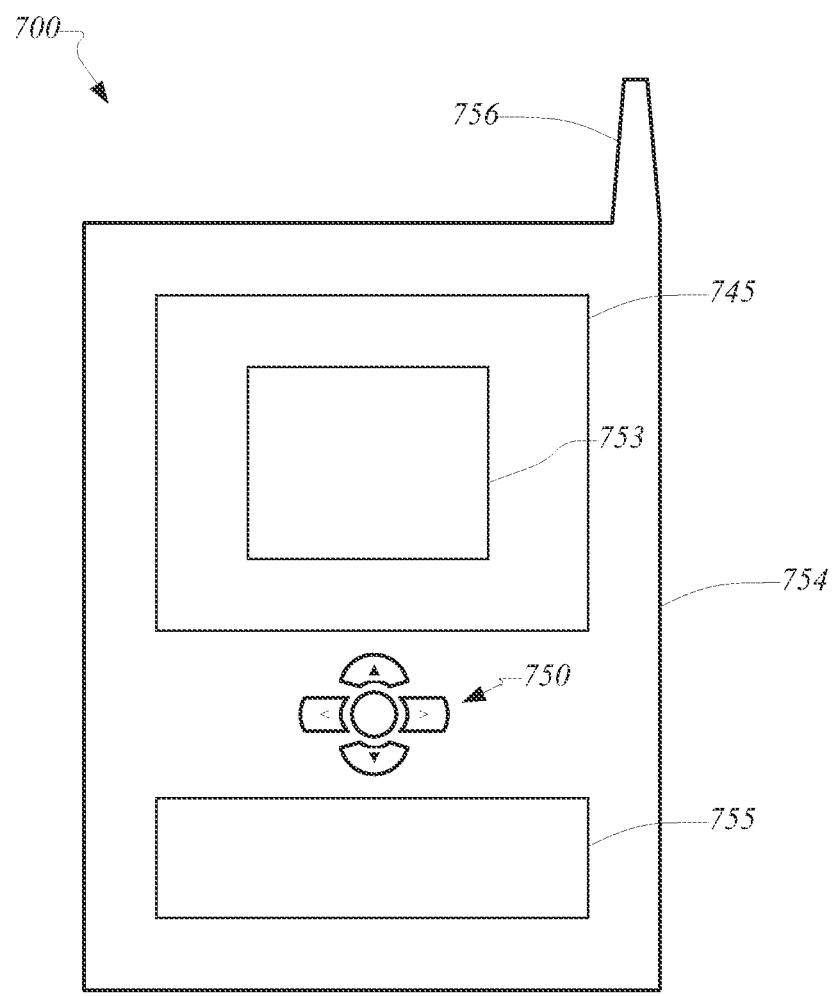
FIG. 7 illustrates one embodiment of a device.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a display 745, a navigation controller 750, a user interface 754, a housing 755, an I/O device 756, and an antenna 757. Display 745 may comprise any suitable display unit for displaying information appropriate for a mobile computing device, and may be the same as or similar to display 645 in FIG. 6. Navigation controller 750 may comprise one or more navigation features which may be used to interact with user interface 754, and may be the same as or similar to navigation controller 650 in FIG. 6. I/O device 756 may comprise any suitable I/O device for entering information into a mobile computing device. Examples for I/O device 756 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

A method may comprise receiving, by a graphics management module, graphics information from a processor circuit arranged to execute a graphics application, generating, by the graphics management module, graphics processing information based on the graphics information, and sending the graphics processing information to a graphics processor circuit arranged to generate graphics display information based on the graphics processing information.

Such a method may comprise storing the graphics display information in a graphics memory unit.

Such a method may comprise storing graphics control information in a graphics memory unit.

Such a method may comprise receiving the graphics control information from the graphics memory unit and generating the graphics processing information based on the graphics control information.

According to such a method, the processor circuit comprising one or more cores of a multi-core processor and the graphics management module comprising one or more other cores of the multi-core processor.

Alternatively, according to such a method, the processor circuit comprising a first processor circuit and the graphics management module comprising a second processor circuit.

Such a method may comprise generating the graphics information based on a first instruction set and generating the graphics processing information using a second instruction set that differs from the first instruction set.

Such a method may comprise compiling instructions of the first instruction set using a first compiler and compiling instructions of the second instruction set using a second compiler different than the first compiler.

Such a method may comprise receiving the graphics information from the processor circuit over a graphics bus.

Such a method may comprise encrypting one or more of the graphics information, the graphics processing information, and the graphics display information.

A communications device may be arranged to perform such a method. At least one machine readable medium may comprise a plurality of instructions that in response to being executed on a computing device, cause the computing device to carry out such a method.

An apparatus may comprise means for performing such a method.

An apparatus may comprise a graphics management module operative to receive graphics information from a processor circuit arranged to execute a graphics application, and the graphics management module may be operative to receive the graphics information from the processor circuit over a graphics bus, generate graphics processing information based on the graphics information, and send the graphics processing information to a graphics processor circuit arranged to generate graphics display information based on the graphics processing information.

In such an apparatus, the graphics display information may be stored in a graphics memory unit.

In such an apparatus, graphics control information may be stored in the graphics memory unit, and the graphics management module may be operative to access the graphics control information in the graphics memory unit and generate the graphics processing information based on the graphics control information.

In such an apparatus, the processor circuit may comprise one or more cores of a multi-core processor, and the graphics management module may comprise one or more other cores of the multi-core processor.

In such an apparatus, the graphics information may be generated using a first instruction set, and the graphics management module may generate the graphics processing information using a second instruction set that differs from the first instruction set.

In such an apparatus, the graphics management module may be operative to encrypt the graphics processing information.

A system may comprise such an apparatus and an audio device communicatively coupled to the processor circuit.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    storing, by graphics management circuitry, a graphics driver in a graphics memory unit that is not accessible to a processor circuit arranged to execute a graphics application;
    receiving, by the graphics management circuitry, application-level graphics data from the processor circuit via a private graphics bus, the application-level graphic data generated based on a first instruction set;
    retrieving, by the graphics management circuitry, the graphics driver from the graphics memory unit;
    executing, by the graphics management circuitry, the graphics driver to generate graphics processing information based on the application-level graphics data, the graphics processing information generated based on a second instruction set that differs from the first instruction set; and
    sending the graphics processing information to a graphics processor circuit arranged to generate graphics display information based on the graphics processing information.

2. The method of claim 1, comprising:
    storing the graphics display information in the graphics memory unit.

3. The method of claim 1, the processor circuit comprising one or more cores of a multi-core processor and the graphics management circuitry comprising one or more other cores of the multi-core processor.

4. The method of claim 1, the processor circuit comprising a first processor circuit and the graphics management circuitry comprising a second processor circuit.

5. The method of claim 1, comprising:
    compiling instructions of the first instruction set using a first compiler; and
    compiling instructions of the second instruction set using a second compiler different than the first compiler.

6. The method of claim 1, comprising:
    encrypting one or more of the application-level graphics data, the graphics processing information, and the graphics display information.

7. At least one non-transitory machine-readable medium comprising a plurality of instructions that in response to being executed on a computing device, cause the computing device to:
    store, by graphics management circuitry, a graphics driver in a graphics memory unit that is not accessible to a processor circuit arranged to execute a graphics application;
    receive, by the graphics management circuitry, application-level graphics data from the processor circuit via a private graphics bus, the application-level graphic data generated based on a first instruction set;
    retrieve, by the graphics management circuitry, the graphics driver from the graphics memory unit;
    execute, by the graphics management circuitry, the graphics driver to generate graphics processing information based on the application-level graphics data, the graphics processing information generated based on a second instruction set that differs from the first instruction set; and send the graphics processing information to a graphics processor circuit arranged to generate graphics display information based on the graphics processing information.

8. The at least one non-transitory machine-readable medium of claim 7, comprising instructions that, in response to being executed on the computing device, cause the computing device to:

compile instructions of the first instruction set using a first compiler; and compile instructions of the second instruction set using a second compiler different than the first compiler.

9. An apparatus, comprising:

a processor circuit arranged to execute a graphics application;

a graphics memory unit that is not accessible to the processor circuit; and graphics management circuitry operative to:
  store a graphics driver in the graphics memory unit;
  receive application-level graphics data from the processor circuit over a private graphics bus, the application-level graphic data generated based on a first instruction set;
  retrieve the graphics driver from the graphics memory unit;
  execute the graphics driver to generate graphics processing information based on the application-level graphics data, the graphics processing information generated based on a second instruction set that differs from the first instruction set; and
  send the graphics processing information to a graphics processor circuit arranged to generate graphics display information based on the graphics processing information.

10. The apparatus of claim 9, the graphics display information stored in the graphics memory unit.

11. The apparatus of claim 9, the processor circuit comprising one or more cores of a multi-core processor, the graphics management circuitry comprising one or more other cores of the multi-core processor.

12. The apparatus of claim 9, the graphics management circuitry operative to encrypt the graphics processing information.

13. A system, comprising:

a processor circuit arranged to execute a graphics application;

an audio device communicatively coupled to the processor circuit;

a graphics memory unit that is not accessible to the processor circuit; and graphics management circuitry operative to:
  store a graphics driver in the graphics memory unit;
  receive application-level graphics data from the processor circuit over a private graphics bus, the application-level graphic data generated based on a first instruction set;
  retrieve the graphics driver from the graphics memory unit;
  execute the graphics driver to generate graphics processing information based on the application-level graphics data, the graphics processing information generated based on a second instruction set that differs from the first instruction set; and
  send the graphics processing information to a graphics processor circuit arranged to generate graphics display information based on the graphics processing information.

14. The system of claim 13, the graphics display information stored in the graphics memory unit.

15. The system of claim 13, the graphics management circuitry operative to encrypt the graphics processing information.

* * * * *